Dec. 9, 1958
R. M. PAGE
2,863,946
MULTIPLEX COMMUNICATION SYSTEM
Filed May 31, 1956
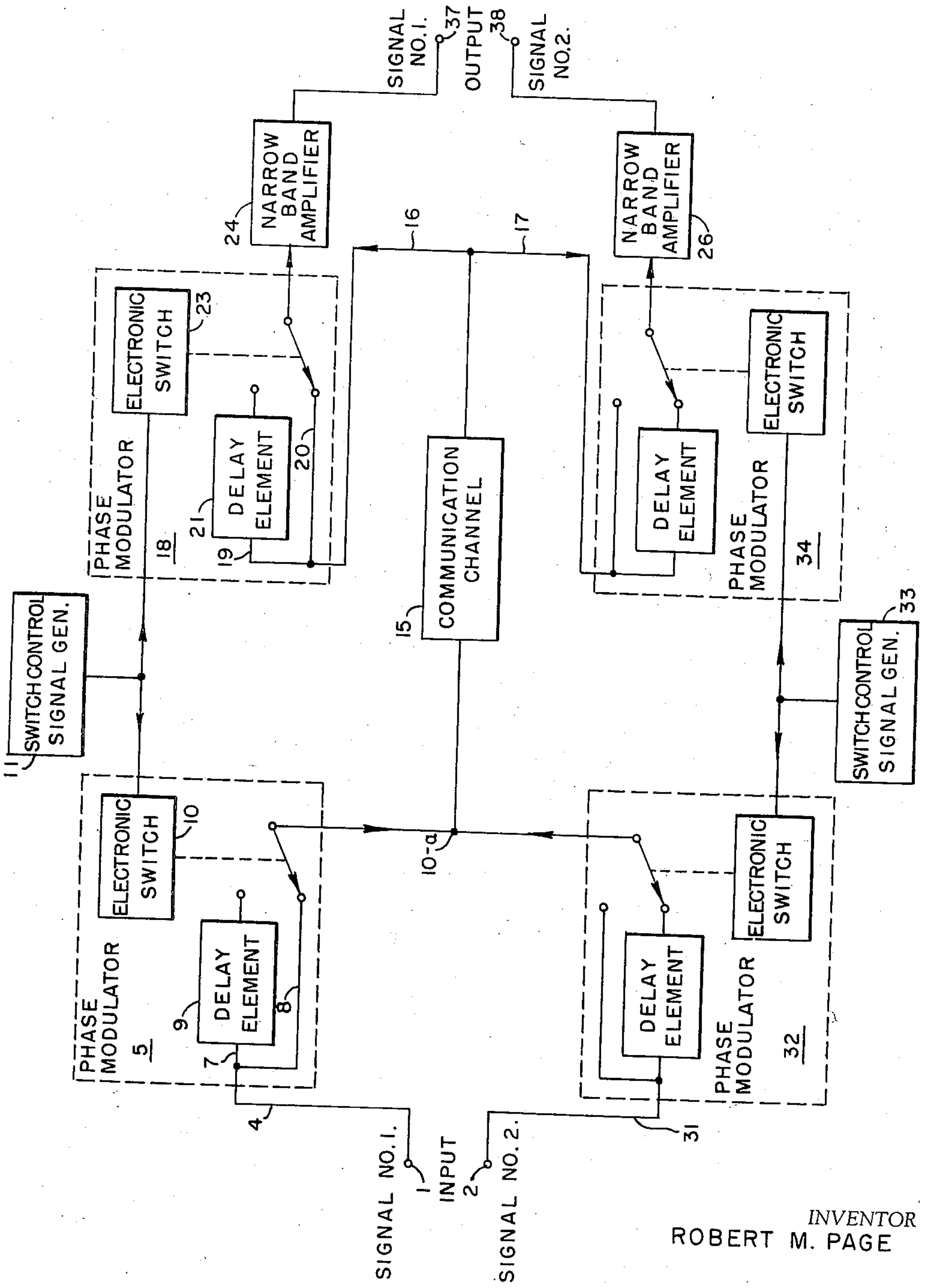
INVENTOR
ROBERT M. PAGE
BY W R Maltby
Richard C Reed ATTORNEYS United States Patent Office 2,863,946

Patented Dec. 9, 1958

2,863,946

MULTIPLEX COMMUNICATION SYSTEM

Robert M. Page, Camp Springs, Md., assignor to the United States of America as represented by the Secretary of the Navy Application May 31, 1956, Serial No. 588,593

4 Claims. (Cl. 179—15)

(Granted under Title 35, U. S. Code (1952), sec. 266)

The invention described herein may be manufactured and used by or for the Government of the United States of America for governmental purposes without the payment of any royalties thereon or therefor.

This invention relates to multiplex communication systems, and more particularly to such systems wherein multiplexing is achieved by phase modulation, whereby signals from a plurality of different sources can be processed simultaneously in a common communication channel without loss of identity, and subsequently recovered separately for further utilization.

In many prior art communication systems it is desirable to process in a common communication channel a plurality of signals having the same carrier frequency, and yet recover the signals separately from the common communication channel for subsequent separate utilization. Communication systems for handling signals in this way are well known to the prior art in both the wire and wireless form, and are commonly referred to as systems of the multiplex type.

In such systems the common comunication channel through which the plurality of signals are processed may take the form, for example, of a radio link, a coaxial cable, or a component of the transmitting or receiving portion only of a complete communication system.

In many multiplex communication systems of the prior art, the advantages of processing a plurality of signals in a common communication channel can only be gained by doing so in a sequential or time sharing manner, to avoid destructive signal interference. The present invention enables the processing of a plurality of signals through a common communication channel simultaneously, rather than sequentially, and thus enables a large order increase in the speed and efficiency with which a plurality of signals can be communicated.

It is an object of this invention therefore to provide a multiplex communication system in which a plurality of signals may be distinguished for processing simultaneously in a common communication channel and recovered separately thereafter.

It is another object to provide an improved multiplex communication system in which a plurality of signals can be processed in a common channel without time sharing.

Other objects and features of the present invention will appear more fully hereinafter from the following detailed description considered in connection with the accompanying drawings which disclose one embodiment of the invention. It is expressly understood, however, that the drawings are designed for purposes of illustration only and not as definition of the limits of the invention, for which reference should be had to the appended claims.

In the drawing, the single figure is a schematic block diagram of a multiplex communication system constructed in accordance with the present invention.

Briefly, the present invention contemplates that the plurality of signals to be communicated through the common channel shall be so distinguished prior to delivery to the common channel as to enable their individual recovery from its output without loss or destruction by interference while being processed in the common channel. Preferably the present invention contemplates that the phase of each of the plurality of signals to be communicated shall be modulated, prior to delivery of the signals to the common channel, in such a manner as to characterize each particular signal and distinguish it from the others. The plurality of signals, each bearing its own characteristic phase modulation, are then delivered simultaneously to the common channel for processing. From the output of the common communication channel, the signals are delivered to a plurality of parallel channels, in each of which provision is made to unmodulate the phase of signals in a manner characteristic of only one respective communicated signal. Thus in each of the plurality of channels only a respective one of the original plurality of signals has its phase modulation completely eliminated, and its phase coherence completely restored. That particular signal is selectively recovered from the channel by passing all of the signals in the channel through a phase coherency selective circuit such as a sharply tuned circuit, which rejects all of the signals whose phase has not been restored to an unmodulated condition. Thus in the output of each respective phase coherency selective circuit there is separately recovered only one of the individual signals communicated through the common communication channel.

A multiplex communication system constructed in accordance with my invention is shown in the drawings. Elements 1 and 2 are illustrative of two separate sources of signals, which may have the same carrier frequency. A signal arriving at terminal 1 is fed through input channel 4 to phase modulator 5, wherein the phase of the carrier frequency of the signal is varied at a selected frequency, and preferably in an abrupt fashion, from its reference value at the input of phase modulator 5 to another fixed value displaced from the reference, preferably by 180°. This phase variation serves to characterize and distinguish the signal at terminal 1 from that at terminal 2, as will appear more fully hereinafter.

Phase modulator 5 may consist, for example, of two parallel signal paths 7 and 8, one of which 7 includes a conventional half-wave delay network 9, and a switch 10 for connecting the output of phase modulator 5 through one signal path 7 or the other path 8 to point 10–*a*. Switch 10 may take any conventional form, though if the switching frequency is high it is preferable to use an electronic switch, of conventional design. Operation of the switch 10 is preferably controlled by a switch control signal generator 11, which may be preferably a square wave generator, operating at a selected frequency $f_1$.

From phase modulator 5, the signal from terminal 1 is delivered to point 10–*a* for processing by a communication channel 15, which as shown in exemplary form may be a wireless link or a wire cable. From communication channel 15 the signal is fed to two parallel output channels 16 and 17. In channel 16 is another phase modulator 18 which is in all respects similar to phase modulator 5 and includes two parallel signal paths 19 and 20, one of which 19 includes a delay element 21. Paths 19 and 20 are terminated in a switch 23, shown here as of the electronic type. Switch 23, like switch 10 of phase modulator 5, is controlled by the output signal from control signal generator 11 or is at least synchronized with switch 10 in some other convenient manner. The output of phase modulator 18 is connected to a narrow bandwidth amplifier 24.

The function of phase modulator 18 is to unmodulate the phase of signals from modulator 5 and thereby to restore the phase coherency of signals from terminal 1. This unmodulation and restoration is accomplished by synchronizing the operation of switch 23 in phase modulator 18 with the operation of switch 10 in phase modulator 5, and by providing in phase moduator 18 a delay element 21 of the proper size to shift the phase of the signal an amount which will make the output signal from modulator 18 maintain a fixed relation to the phase of the input signal from element 1. More particularly the phase shifts imparted to the signal by the delay elements 9 and 21 determine in part the mode of operation of the switches 10 and 23. For instance, if both delay elements 9 and 21 provide exactly 180° phase lag to the signal then the switches 10 and 23 can be operated either in phase or out of phase. Specifically in this case the switches may effect synchronous connection between input channel 4 and amplifier 24 either through paths 7, 19 and 8, 20 or through paths 8, 19 and 7, 20. In either event the apparent phase of the output signal from modulator 18 is unchanged during the operation of the switches. In this case this output signal is said to be "coherent." However, if elements 9 and 21 provide and correct for phase lags other than 180°, respectively, then only inphase operation of the switches 10 and 23, connecting path 7 only to path 19 and path 8 only to path 20, may be employed.

It is of critical importance to the proper operation of the system above described that the bandwidth of the communication channel 15 be sufficiently wide to accommodate the principal frequency components created by the phase shifts imposed upon the signals by phase modulator 5. In this way the phase modulated signals will be preserved without undue distortion while passing through the communication channel 15, so that upon phase unmodulation in modulator 18, phase coherency of the signals will be preserved.

If delay element 21 provides a 180° phase shift, the signal from terminal 2 may be fed either directly through communication channel 15 to a narrow band amplifier 26, or alternatively it may be processed in the same manner as that from terminal 1. In the event the latter method is preferred, signals from terminal 2 are fed through input channel 31 to phase modulator 32, which is in all respects similar to phase modulator 5. Phase modulator 32 is controlled by the output waveform from control signal generator 33, which may be preferably a square wave. The operating frequency $f_2$ of generator 33 is different from, and not harmonically related to, the operating frequency $f_1$ of generator 11. The output signal from phase modulator 32 is fed to point 10-*a* and the communication channel 15, just as are signals from terminal 1. From the output of communication channel 15 the signals from terminal 2 are fed to the two parallel channels 16 and 17. Channel 17 contains a phase modulator 34 which is in all respects similar to phase modulator 18, and is controlled in synchronism with phase modulator 32 by control signal generator 33, in the manner of synchronized phase modulators 5 and 18. Thus, like signals from terminal 1 in the output of phase modulator 18, signals from terminal 2 whose phase coherency has been disrupted by the phase modulation imposed by modulator 32 are restored to complete phase coherence in the output of phase modulator 34.

The phase modulation of the signal from terminal 1, as performed in phase modulator 5, is controlled by generator 11 to occur at a frequency $f_1$, while the phase modulation of the signal from terminal 2, as produced in phase modulator 32 under the control of generator 33 occurs at a different frequency $f_2$. Thus it may be seen that the signal from terminal 1, which from the output of communication channel 15 enters the output channel 17, will not have its phase unmodulated at the proper frequency, and as a result will appear in the output of phase modulator 34 as a phase incoherent signal. Likewise, it may be seen that the signal from terminal 2, which from the output of common channel 15 enters the channel 16, will not have its phase unmodulated at the proper frequency in phase modulator 18, and this signal will appear phase incoherent in the output of phase modulator 18.

The present invention contemplates that the phase coherent portions of the output signals from phase modulators 18 and 34, which portions represent respectively the signals from terminals 1 and 2, can be recovered by connecting the outputs of phase modulators 18 and 34 to respective phase coherency responsive devices, which are selectively responsive to signals which have good phase coherency, and whose response to signals which are phase incoherent is very poor. One exemplary form of phase coherency responsive device for performing this function is a sharply tuned circuit, such as a highly selective, narrow bandwidth amplifier tuned to the input signal frequency. The outputs of phase modulators 18 and 34 are therefore connected to respective narrow bandwidth amplifiers 24 and 26.

For proper operation, the bandwidth of amplifiers 24 and 26 must be sufficiently narrow so that the time required to build up an appreciable signal voltage across the resonant circuits therein exceeds the time during which the phase of the output signal from modulator 5 or 32 is maintained constant at any one value. For example, if the switching rate is 1 megacycle per second, the buildup response time of the narrow bandwidth amplifier should exceed 1 microsecond. By the same token it is an obvious corollary that the switching rate should preferably be low relative to the frequency of the input signals applied at terminals 1 and 2. In this way the substantially phase coherent signal from terminal 1 in the output of phase modulator 18 is able to engender an appreciable signal buildup in amplifier 24, and is selectively recovered thereby, whereas the phase incoherent output of phase modulator 18 which represents the signal from terminal 2 never remains constant in phase long enough to engender any substantial output in amplifier 24. In like manner, amplifier 26 selectively recovers that portion of the output of phase modulator 34 which represents the signal from terminal 2. The output signals from amplifiers 24 and 26, respectively, are fed to output terminals 37 and 38, for subsequent utilization in any desired manner.

Thus it may be seen that, by means of the multiplex communication system herein described, any number of signals having the same frequency but conveying different intelligence may be processed simultaneously in one common communication channel without loss of ability to recover the signals separately from the output of the common communication channel. While in the preferred embodiment above described the modulation of the phase of the input signals takes the form of 180° square wave modulation, at the two fixed frequencies $f_1$ and $f_2$, this invention contemplates that the modulation of the phase in any input channel can take place at a variable frequency, and with any degree of smoothness or abruptness. Moreover the phase shift may be any function of time so long as input and output phase modulation is synchronized. However, for most effective recovery of each respective input signal in a respective output channel, the condition should be fulfilled that for every increment of time during which the phase of an input signal is shifted to a particular value, there is an equal increment of time during which the phase is shifted back to a value 180° opposite to the particular value, and these two increments of time must not be spaced further than the signal buildup time of the phase coherency responsive devices. Put another way, the average value of signal phase shift, measured over a time period not longer than the signal buildup time of the phase coherency responsive devices, must be zero.

From the foregoing it is obvious that considerable modification of the basic invention is possible. It is therefore to be understood, that within the scope of the appended claims, the invention may be practiced otherwise than as specifically described.

What is claimed is:

1. Means for distinguishing signals from a plurality of separate sources for simultaneous processing in a common communication channel and separate recovery thereafter comprising an input channel for the signal from each respective signal source, means for modulating the phase of the signals in said respective input channels at different respective selected rates, means connecting all of said input channels to said common communication channel, a plurality of output channels connected to said common communication channel, means for unmodulating the phase of signals in each respective output channel at one of said respective selected rates, and respective signal phase coherency responsive means terminating each of said output channels.

2. Means for distinguishing respective signals having substantially the same carrier frequency received simultaneously from different respective sources to enable simultaneous transmission in a common communication channel and separate recovery thereafter comprising first respective phase modulating means for reversing the phase of said respective signals at different respective rates, means connecting said phase modulated signals to said common communication channel, a plurality of output channels fed by the output of said common communication channel, second respective phase modulation means for reversing the phase of signals in said respective output channels at said different respective rates, respective phase coherency responsive means terminating said respective output channels, and means synchronizing said first and second respective phase modulation means to engender output signals from said respective phase coherency responsive means.

3. The method of distinguishing a plurality of signals having substantially the same carrier frequency to enable their separate recovery after simultaneous processing in a common communication channel which comprises the steps of reversing the phase of each of said respective signals at a selected respective rate to disrupt the phase coherence of said respective signals prior to introduction of said signals into said common communication channel, dividing the output signals of said common communication channel into a plurality of equal parts, reversing the phase of each of said parts of the output of said receiver in synchronism with said prior respective phase reversals to restore in each part of said output the phase coherence of one respective signal and disrupt the phase coherence of the other signals, and recovering from each part of said output that portion which is phase coherent.

4. A multiplex communication system comprising a plurality of signal input terminals, common signal processing means, respective signal input channels connecting each of said input terminals to the input of said common processing means, first phase modulation means in each of said receiver input channels for reversing the phase of the signal in said channel responsive to a control signal, a plurality of phase coherency responsive means for producing output signals proportional to the phase coherency of their input signals, respective output channels connecting the output circuit of said common signal processing means to each of said phase coherency responsive means, second phase modulation means in each receiver output channel for reversing the phase of the signal in said path responsive to a control signal, a plurality of respective control signal generator means for synchronizing the operation of respective first phase modulation means and respective second phase modulation means at different respective modulation frequencies, whereby the phase coherency of signals from respective input terminals is restored in respective output channels, and respective signal output terminals connected to said respective phase coherency responsive means.

References Cited in the file of this patent

UNITED STATES PATENTS

| | | |
|---|---|---|
| 2,680,151 | Boothroyd | June 1, 1954 |
| 2,760,006 | Lieberman | Aug. 21, 1956 |